J. E. LEONARD.
FILM MOVING MECHANISM FOR MOTION PICTURE CAMERAS.
APPLICATION FILED MAR. 30, 1920.

1,390,247.

Patented Sept. 6, 1921.
3 SHEETS—SHEET 1.

INVENTOR
JOHN E. LEONARD
BY Hazard & Miller
ATT'YS.

J. E. LEONARD.
FILM MOVING MECHANISM FOR MOTION PICTURE CAMERAS.
APPLICATION FILED MAR. 30, 1920.
1,390,247.
Patented Sept. 6, 1921.
3 SHEETS—SHEET 2.
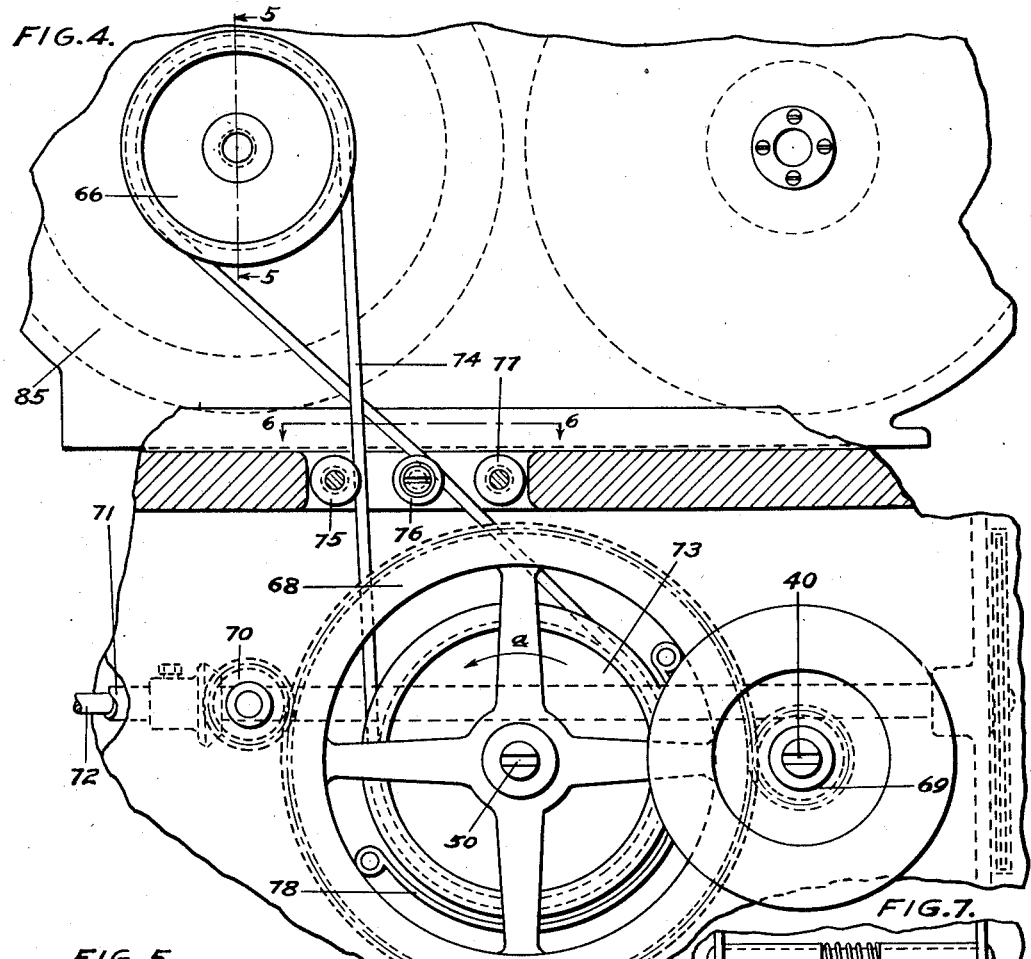
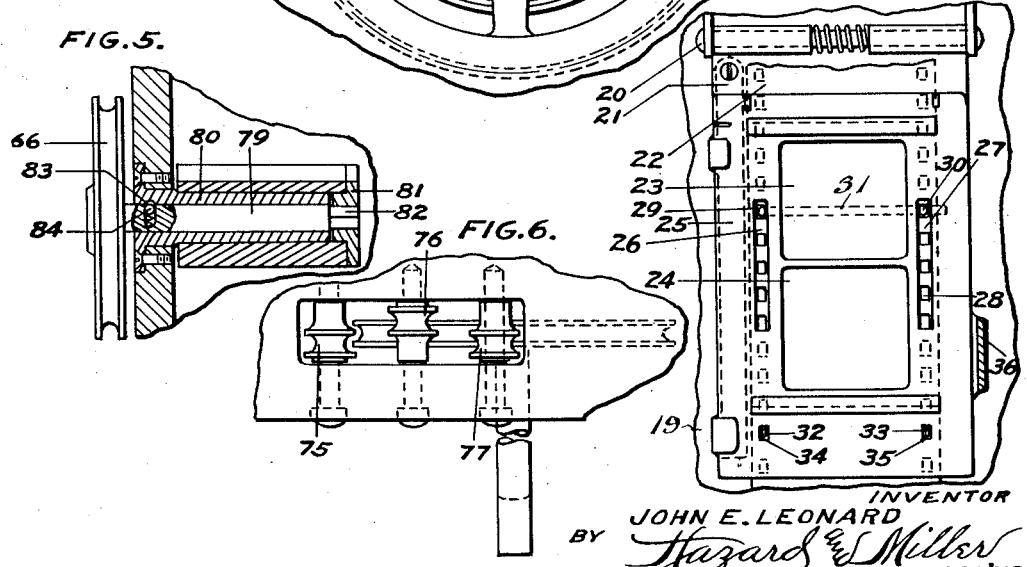
INVENTOR
JOHN E. LEONARD
BY Hazard & Miller
ATT'YS.

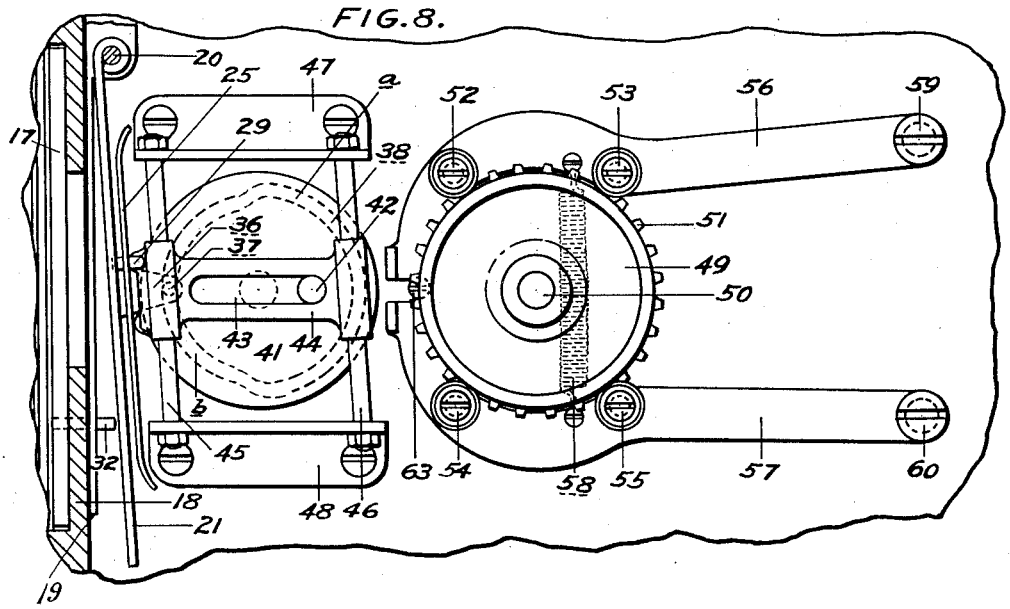
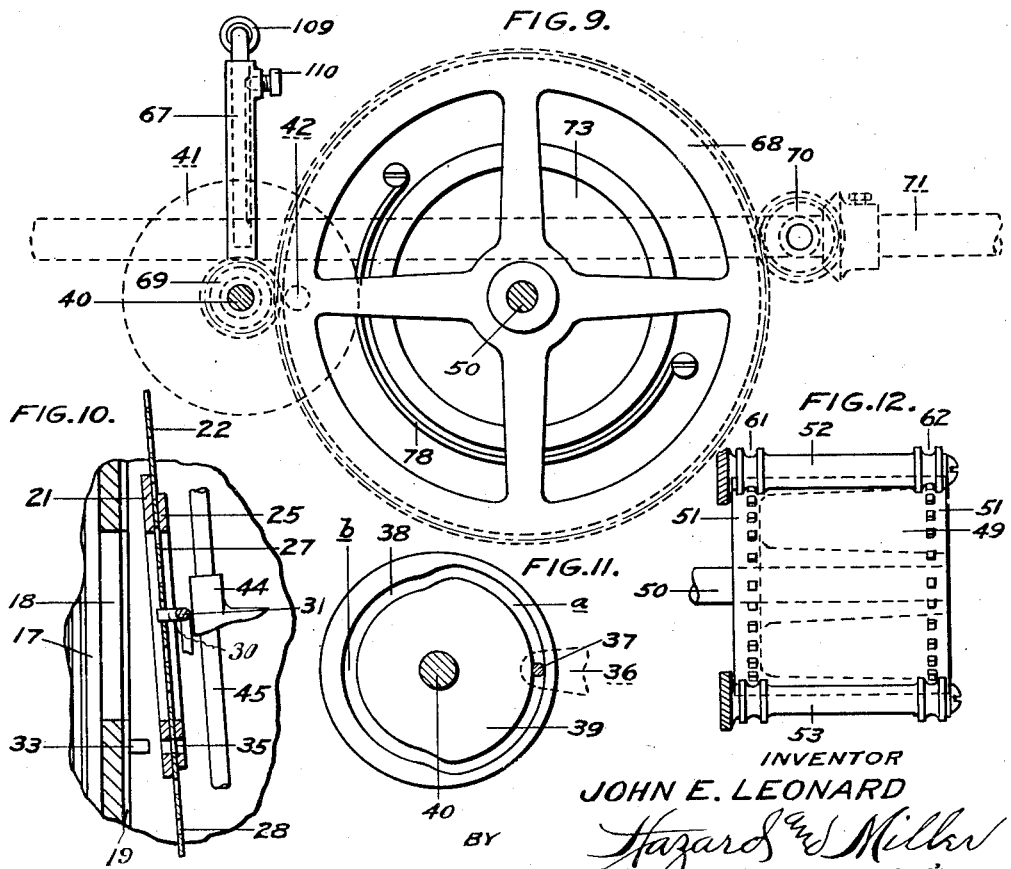

UNITED STATES PATENT OFFICE.

JOHN E. LEONARD, OF LOS ANGELES, CALIFORNIA, ASSIGNOR, BY MESNE ASSIGNMENTS, TO MITCHELL CAMERA CO., A CORPORATION.

FILM-MOVING MECHANISM FOR MOTION-PICTURE CAMERAS.

1,390,247.     Specification of Letters Patent.     Patented Sept. 6, 1921.

Substitute for application Serial No. 163,496, filed April 20, 1917. This application filed March 30, 1920. Serial No. 369,855.

*To all whom it may concern:*

Be it known that I, JOHN E. LEONARD, a citizen of the United States, residing at Los Angeles, in the county of Los Angeles and State of California, have invented new and useful Improvements in Film-Moving Mechanism for Motion-Picture Cameras, of which the following is a specification.

This invention relates to a moving picture camera and particularly pertains to a film moving mechanism therefor.

It is the principal object of this invention to provide a mechanism for moving the film of a motion picture camera which is designed so as to produce continuous intermittent movement of the film in a positive manner.

Another object of this invention is to provide means for insuring that the film will be positively locked before the exposure aperture when the exposure is made and will thereafter be instantly released to permit the advance of the film.

Another object of this invention is to provide a film moving mechanism which is decidedly simple in its construction and which is composed of few parts compactly assembled in relation to each other.

Another object of this invention is to provide a film moving mechanism which will carry the film without producing an objectionable amount of friction and will thereby prevent the production of "static" which has proven so objectionable in motion picture work.

Another object of this invention is to provide a film moving mechanism which will positively engage the film and advance it a given distance without danger of tearing the film or interruption in the movement thereof.

It is a further object of this invention to provide a film moving mechanism of the above class which is formed of parts having considerable strength and which are not delicately constructed and are not liable to become objectionably worn.

Other objects will appear hereinafter.

The invention is illustrated, by way of example, in the accompanying drawings in which:

Fig. 4 is an enlarged fragmentary view illustrating the driving mechanism provided the film moving apparatus.

Fig. 5 is a view in section as seen on the line 5—5 of Fig. 4 and as illustrating the detachable mounting of the driving spool and the means for driving said spool.

Fig. 6 is a fragmentary view in elevation as seen on the line 6—6 of Fig. 4 and illustrates the means provided for guiding the spool driving belt.

Fig. 7 is a view in elevation illustrating the film slide-plate.

Fig. 8 is an enlarged fragmentary view of the film moving mechanism disclosing the mechanism with its film in a locked position.

Fig. 9 is a view illustrating the driving mechanism provided the entire film moving apparatus, as well as the shutter.

Fig. 10 is a fragmentary view in section and elevation disclosing the means whereby the film is positively advanced and the manner in which it is locked during the moment between advances of the film.

Fig. 11 is a view in elevation illustrating the face cam provided to oscillate the side plate and thereby lock and unlock the film.

Fig. 12 is a view in elevation disclosing the positive means provided for continuously advancing the film.

Figure 1:
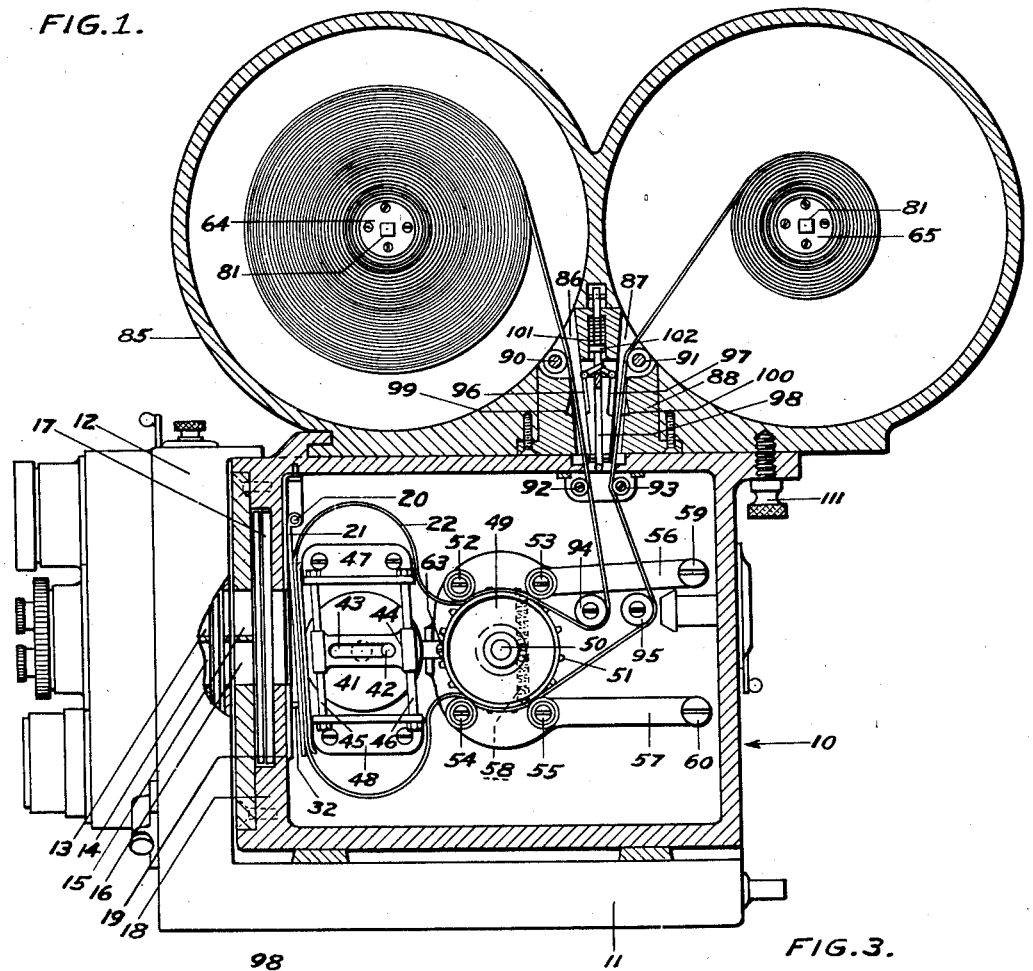
Figure 1 is a view in section and elevation with parts broken away illustrating the entire moving picture camera fitted with its film magazines and particularly disclosing the film moving mechanism.

Referring more particularly to the drawings, 10 indicates a camera case, here shown as mounted upon a base-block 11. The block is formed with vertically extending front portion 12 through which exposure apertures 13 and 14 are formed. These apertures are normally in register with apertures 15 and 16 formed through the front of the case. Mounted over the rear of these apertures is a rotating shutter mechanism 17. This mechanism is preferably of the construction disclosed in my U. S. Patent No. 1297703, dated March 18, 1919, for shutter dissolve for motion picture cameras. Mounted within the case and secured to the inner face of the front side 18 is a face-plate 19 at the upper end of which is mounted a horizontally extending hinge-pin 20. This pin supports a slide-plate 21 along which the photographic film 22 advances. The slide-plate is formed, as particularly shown in Fig. 7 of the drawings, with a rectangular top opening 23 and an opening 24 of similar size disposed beneath the top opening. These openings are in register with the exposure apertures 15 and 16 and permit light rays to pass to the film. The slide-plate formed with the two openings 23 and 24 is particularly adapted for use with my co-pending application entitled Double exposure mechanism for motion picture cameras, filed Mar. 30, 1920 and bearing the Serial No. 369,854. The film is held over the openings by means of a guard-plate 25 which is secured to the slide-plate 21 and is so spaced as to permit the film to pass between it and the rear face of the other plate.

The guard-plate 25 is formed with parallel slots 26 and 27 disposed upon opposite sides of the apertures 23 and 24 and so designed as to extend an equal distance above and an equal distance below the center between said apertures. These slots are in register with perforations 28 formed at given intervals along the opposite sides of the strip of film. The slots are provided to allow feed-fingers 29 and 30 to extend through the slots and project into the perforations. The feed-fingers 29 and 30 are carried by a horizontally disposed reciprocating cross head that is constructed and operates in a manner hereinafter more fully described.

Secured in the plate 19 and extending horizontally therefrom are a pair of locking-pins 32 and 33. These pins extend through perforations 34 and 35 at the bottom of the slide-plate which permit the film to be locked by the pins. This is due to the fact that the pins are adapted to extend through the perforations 28 at the opposite sides of the film and will thus lock the film against movement during that time. The slide-plate, however, is oscillated upon the hinge-pin 20 and causes the openings 34 and 35 in the slide-plate to move in and out of register with the lock-pins, thus intermittently securing the film against movement.

The oscillating movements of the slide-plate is effected by an arm 36 which is fastened at the side of the slide-plate and is provided with a cam-pin 37 in register with a groove 38 in the face of cam 39. It will be understood that the arm 36 extends at right-angles to the slide-plate and parallel to the face of the cam 39. This cam is mounted upon an actuating shaft 40 and is adapted to rotate therewith. The shaft 40 is formed integral with a crank-disk 41 upon which a crank-pin 42 is fixed. This pin is off-set in relation to the rotating axis of the shaft 40. The pin extends into a slot 43 of a reciprocating cross-head 44, said head being given a vertical reciprocating movement as the crank-disk 41 rotates and the pin 42 slides along the slot 43. The head is slidably mounted at its outer ends upon guide-rods 45 and 46. These rods are fitted with brackets 47 and 48 which support the rods in parallel relation to each other within the camera case. Referring particularly to Fig. 8 it will be seen that these rods are inclined to the vertical and that they are substantially parallel to the slide-plate when it has swung away from the face-plate 19, as there indicated in solid lines. The feed-bar 31 is fixed to the cross-head and supports the feed-fingers 29 and 30 in horizontal relation to each other and in perpendicular relation to the slide-plate when it assumes the position illustrated in the full lines of Fig. 8. When in this position the feed-fingers will register with perforations 28 in the film and as the cross-head is reciprocated will draw the feed-fingers down the length of the slots 26 and 27 and at the same time will draw the film down the same distance. It will be understood that this distance corresponds to the height of the exposure openings 23 and 24, thus insuring that the film will be advanced one exposure length.

The film is positively fed to the slide-plate and moved therefrom by means of a rotating feed-drum 49. This drum is secured upon a shaft 50 parallel to the actuating shaft 40 and is simultaneously driven by means of a driving mechanism which will be hereinafter described. The drum is of a width slightly greater than the width of the film and is formed with two parallel rows of outwardly extending teeth 51 which mesh with the perforations in the opposite sides of the film. The film is retained upon the drum by a series of four guard-rollers 52, 53, 54 and 55. These rollers are mounted in pairs, the rollers 52 and 53 being secured upon a resiliently held arm 56 and the rollers 54 and 55 being similarly mounted upon a resilient arm 57. These arms are held toward each other by a coil-spring 58, the opposite ends of which are secured to the arms. As particularly shown in Fig. 8 of the drawings, the arms are pivoted at the rear of the camera case upon pivot-screws 59 and 60, from which screws the arms extend with a straight shank and are formed with arcuate ends substantially corresponding in contour to the outer circumference of the drum 49. Referring particularly to Fig. 12 it will be seen that these rollers are formed with circumferential grooves 61 and 62 which span the teeth upon the drum. It is to be distinctly understood that the rollers are not intended to bear upon the drum at any point and are supported in spaced relation thereto by a stop-screw 63 against the outer free ends of which each arm abuts. This, therefore, provides that the film will be guarded so that it will not jump from the drum and yet relieves the film from pressure and friction which would tend to produce a condition whereby static electricity would be generated and accumulated within the mechanism.

As will be seen from an examination of Fig. 1, the drum 49 feeds the film toward and away from the film moving mechanism. This causes the film from a spool 64 to be drawn into the camera case and the exposed film to be fed outwardly from the camera case. This film will be taken up upon a film spool as it is driven by a pulley 66 connected by a belt to the actuating mechanism of the camera. This mechanism is controlled by a crank 67 which may be mounted either upon the cam drive 50, or the actuating shaft 40, both of which have been previously described and located. These shafts are formed with slotted ends upon which the socket of the crank may be positioned and from which the crank may be easily removed. A large gear 68 is mounted upon the shaft 50 and adapted to rotate therewith. The shaft 40 is fitted with a small gear 69 in mesh with the gear 68 and normally driven thereby as when the film is advanced through the machine the shaft 50 is rotated by the crank. A gear 70 is also in mesh with the large gear 68 and furnishes driving power to sleeve 71 and 72 by which the shutter is driven. Mounted upon the shaft 50 and adapted to rotate therewith is a pulley 73 around which a belt 74 passes and leads to the pulley 66 by which the film is taken up after the exposure. Reference being had to Fig. 6 it will be seen that the belt 74 is provided with guide-rollers 75, 76 and 77 over which the belt passes and by which it is maintained in proper relation to the pulley 73. A semi-circular guide-shield 78 is positioned partially around the pulley 73 in order to maintain the belt in its proper place.

Referring to Fig. 5 of the drawings, it will be seen that the pulley 66 is mounted upon a shaft 79 which permits it to be detachably positioned within the spools of the film magazine. This shaft is rotatably mounted within a fixed sleeve 80 upon which the film spool is positioned. The outer end of the spool is formed with a plate 81 having a square hole through it adapted to receive the squared end 82 of the shaft 79 and thereby permitting the spool to be rotated in unison with the shaft. In order that the shaft and pulley may be withdrawn from the spool and positioned in the opposite spool, a small annular channel 83 is formed around the bore of the sleeve 80 and is adapted to receive a spring-pressed catch-ball 84 which will normally hold the shaft in position.

In order that the film magazine 85 may be automatically sealed to prevent exposure of the film when the magazine is removed from the case, the film openings 86 and 87 from the two spool compartments extend downwardly through a casting 88 in the top of the film case. At the side of each of the passage-ways rollers 90 and 91 are positioned to prevent friction of the film. These rollers are disposed at the top of the passage-ways, while other rollers 92 and 93 are positioned within the film case and at the opposite ends of the passage-ways for the same purpose, after which the film is led around fixed idler-rollers 94 and 95. The passage-ways 86 and 87 are provided with trap-shutters 96 and 97 by which the passage-ways are closed. These shutters are pivotally mounted within the casting 88 and are secured to an actuating stem 98 by which they may be swung outwardly and brought with their free ends to register with sealing grooves 99 and 100. The stem is adapted to produce this action by means of a spring 101 within the casting and against a collar 102 upon the stem.

Figure 2:
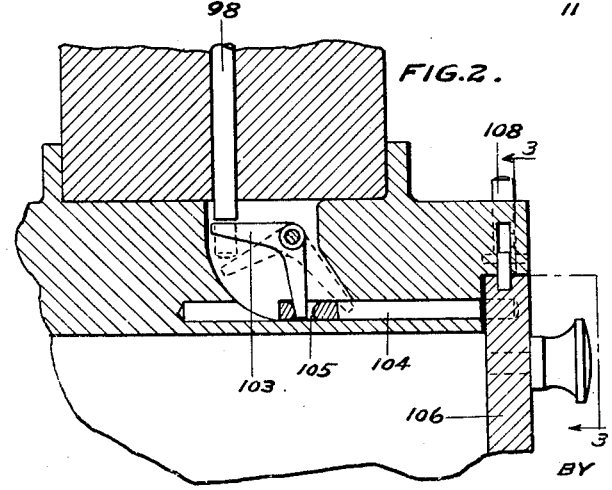
Fig. 2 is an enlarged fragmentary view in section and elevation illustrating the manner in which the film magazine sealing mechanism acts in combination with the side of the camera case.
Figure 3:
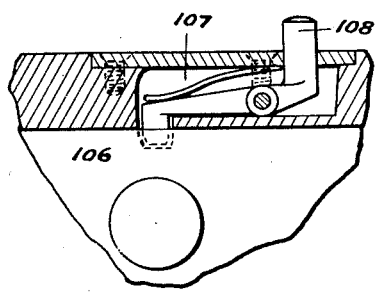
Fig. 3 is an enlarged view in section and elevation as seen on the line 3—3 of Fig. 2 and illustrating the catch provided the side door of the case.

Under normal circumstances when the film magazine is in its proper position upon the top of the camera case the pin 98 bears upon the horizontally disposed leg of a bell-crank 103. This crank is pivotally mounted, as particularly shown in Fig. 2 of the drawings, within the top of the camera case and is held in its horizontal position by means of an actuating rod 104, which is fitted with an opening 105 through which the vertically extending end of the bell-crank projects. This rod extends outwardly and its outer end bears against the inner face of the camera side door 106. A catch 107 is provided to normally lock the side door and indirectly hold the bell-crank in its uppermost position in order to draw the trap-shutters 96 and 97 inwardly and leave the film passage-ways free and open. A thumb-button 108 is forced upon the catch and permits the side door to be released and opened. By this arrangement it will be seen that the bell-crank 103 and the rod 104 produce two desirable results, one of which is to normally maintain the film passage-ways from the film magazine open until the magazine is removed, and the other is to permit the side door of the camera to be opened without exposing the film within the magazine to the light.

In order to permit the film moving mechanism to be adapted to the use of the individual operator, the actuating crank 67 is formed with an adjustable handle 109 which telescopes within the crank-arm and is adjustably locked by means of a set-screw 110, as particularly shown in Fig. 10 of the drawings. By this means various degrees of leverage may be applied to the mechanism and a crank stroke of any desired length may be obtained.

In operation, spools 64 and 65 are positioned within the film magazine and are mounted upon the fixed sleeve 80, as particularly shown in Fig. 5 of the drawings. The pulley-wheel 66 is then fixed within the spool 65 and its belt connected with the pulley 73. It will be understood that upon reverse rotation of the camera, the pulley-wheel will be mounted within the sleeve supporting the spool 64. The film upon the spool 64 is passed downwardly through the film passage-way 86 in the casting 88 around the idler-roller 94, from thence over the upper surface of the driving feed-drum 49, and beneath the guard-rollers 52 and 53 which are mounted upon the arm 56. The film is then led to the top of the slide-plate 21 and passes downwardly between this plate and the guard-plate 25 secured upon the back thereof. This causes the film to pass before the apertures 23 and 24 in the slide-plate. From the slide-plate the film is led over the guard-rollers 54 and 55 upon the arm 57 and beneath the feed-drum 49. The end of the film then passes around the idler-roller 95, over the rollers 93 and 91 and from thence to the spool 65.

The crank-lever 67 is then positioned upon the main drive shaft 50 and the entire apparatus is ready for operation. As the crank is rotated in the direction indicated by the arrow —a— in Fig. 4 the feed-drum 49 will be directly actuated at the same rate of speed and, due to the fact that the teeth of this drum are in register with the perforations 28 along the opposite sides of the film, the film will be positively advanced over the top of the drum and positively withdrawn from the shutter mechanism along the under face of the drum. Due to the manner in which the shafts 40 and 50 are geared to each other by means of the gears 68 and 69 the shaft 40 will also be rotated as the shaft rotates. Its speed of rotation, however, will be at a greater increased ratio over the speed of the shaft 50. As the shaft 40 rotates it will simultaneously rotate the crank-disk 41, with its crank-pins 42 and disk-cam 39, which is positioned in the rear of the crank-disk and upon the same shaft. As the crank-pin moves throughout its cycle of operation, it will travel back and forth along the slot 43 in the cross-head 44 and will cause this cross-head to be reciprocated upon the rods 45 and 46. This will produce a reciprocating motion of the feed-bar and its two feed-fingers 29 and 30. Simultaneous with this action the cam 39 will rotate and will impart an oscillating motion to the slide-plate by means of the pin 37 and the arm 36. The reciprocating motion of the feed-pins and the oscillating motion of the slide-plate are in synchronism and the members are so related to each other as to cause the pins to move on their upstroke, while the cam is holding the slide-plate in its vertically alined position against the face of the plate 19. The instant the crank-pin 42 passes the center and starts on its downstroke the cam-pin 37 will pass from the portion of the cam-slot indicated by the letter —a— and will move along the portion indicated by letter —b—, as particularly shown in Fig. 11 of the drawings. This action will cause the slide-plate to swing outwardly from the face-plate and bring the perforations 28 along the sides of the film into register with the feed-fingers. The cam-pin will quickly draw the slide-plate out to a position parallel to the guide-rods 45 and 46 and will cause it to remain in this position while the feed-fingers move downwardly the length of the slots 26 and 27. This will cause the film to be advanced the length of one picture, as represented by the exposure apertures 23 and 24. The instant the cam-pin again enters the portion —a— of the cam-groove the slide-plate will be moved back to its vertically alined position and out of register with the feed-fingers. A continuation of this cycle of operation will produce continuous intermittent movement of the film, irrespective of the speed of operation of the moving parts, or the direction which the mechanism is actuated.

When the slide-plate is restored to its normal vertical position the lock-pins 32 and 33, which are fixed in the face-plate 19 will pass through openings 34 and 35 in the slide-plate and register with the perforations 28 in the film, thereby locking the film against movement during the interval of exposures by the shutter mechanism 17.

In case access is desired to be attained to the film moving mechanism after the film has been threaded therethrough, the thumb-button 108 may be depressed to release the catch 107. This will allow the side door 106 to swing outwardly and downwardly and relieve the bar 104, which is connected with the bell-crank 103. After this bell is relieved the spring within the casting 88 will cause the stem 98 to move downwardly, as indicated by dotted lines in Fig. 2, and will instantly affect the trap-shutters 96 and 97. These shutters will swing outwardly and strike the grooves 99 and 100 in the opposite sides of the film-passage-ways 86 and 87. This will pinch the film into the groove and at the same time will entirely seal the passage ways to prevent light from entering the film magazines. The short section of film within the case will be exposed, but it will be impossible to damage the film upon the spools. When the camera is to be taken down, the film magazine may be removed by loosening the adjusting screw 111 and when removed will relieve the stem 98, as previously described, and produce the same action to seal the film magazine compartments.

It will thus be seen that the film moving apparatus here provided is effective and direct in its action and is composed of parts which may be compactly assembled and which will act positively under all conditions without danger of damaging the film or becoming inoperative during the actuation thereof.

While I have shown the preferred construction of my film moving mechanism for motion picture cameras as now known to me, it will be understood that various changes in the combination, construction and arrangements of parts may be made by those skilled in the art without departing from the spirit of my invention.

I claim:

1. In a film moving mechanism for motion picture cameras, a face plate having an exposure aperture, a hinge pin carried by the face plate and extending horizontally above the aperture, a slide plate supported upon the hinge pin for oscillatory movement and having an aperture registering with the first aperture, a guard plate secured to the slide plate for oscillation therewith and spaced therefrom; said guard plate having parallel vertical slots upon opposite sides of the exposure aperture and adapted to register with the perforations along the sides of a strip of film; feed fingers mounted to pass through said slots and engage the perforations in the film, means for operating the feed fingers, locking pins extending from the face plate through perforations in the slide plate and adapted to engage in the perforations in the film, and means for oscillating the slide plate to move the film into and out of engagement with the locking pins.

2. In a film moving mechanism for motion picture cameras, locking pins rigidly mounted, a slide plate mounted to oscillate and having perforations through which the pins extend when the plate is moved one way and from which the pins are withdrawn when the plate is moved the other way; said pins being spaced to engage the perforations in the sides of a strip of firm; a guard plate secured to the slide plate and spaced therefrom so that a film may pass between the guard plate and the slide plate, a feed bar mounted to vibrate, feed fingers extending from the feed bar through slots in the guard plate and adapted to engage in the perforations in the sides of the strip of film, and means for operating the feed bar.

3. In a film moving mechanism for motion picture cameras, an oscillating slide plate, guide rods rigidly mounted, a cross-head slidingly mounted upon the guide rods, a shaft rotatably mounted, a crank disk upon the end of the shaft, a crank pin carried by the crank disk and operating in a slot in the cross-head; said slot being crosswise of the guide rods; a feed bar fixed to the cross-head crosswise of the guide rods, a cam upon the shaft and having a cam groove, a pin extending from the slide plate into said cam groove, and feed fingers carried by the feed bar and adapted to engage in the perforations at the sides of a film.

4. In a film moving mechanism for motion picture cameras, a hinge pin, a slide plate supported upon the hinge pin for oscillatory movement, a guard plate secured to the slide plate for oscillation therewith, feed fingers extending through said guard plate and engaging the perforations of a strip of film received between said guard plate and said slide plate, means for operating the feed fingers, locking pins extending through the slide plate and engaging the film perforations, and means for oscillating the slide plate to move the film into and out of engagement with the locking pins.

5. In a film moving mechanism for motion picture cameras, the combination with a face plate having an exposure opening and locking pins projecting from its rear face below said opening, of a spring held slide plate hinged to the face plate above the opening therein and adapted to swing toward and away from said face plate, a guard plate carried by said swinging slide plate, said slide plate and guard plate being provided with coinciding pairs of apertures, which apertures are adapted to receive the locking pins when the slide plate is swung toward the face plate, a wheel mounted for rotation adjacent to said plates, said wheel being provided with a cam groove, an ear projecting from the spring held plate, a pin seated in said ear and positioned in said cam groove, a member mounted for reciprocating movement adjacent to said wheel, which member is provided with a projecting portion that is adapted to pass through the coinciding pairs of apertures in the slide plate and guard plate and engage in the apertures of a film between said plates and driving connections from said wheel to said reciprocating member.

In testimony whereof I have signed my name to this specification.

JOHN E. LEONARD.